Nov. 19, 1963   J. HUBER   3,111,265
RAIL FOR RAILWAY VEHICLES
Filed May 26, 1961
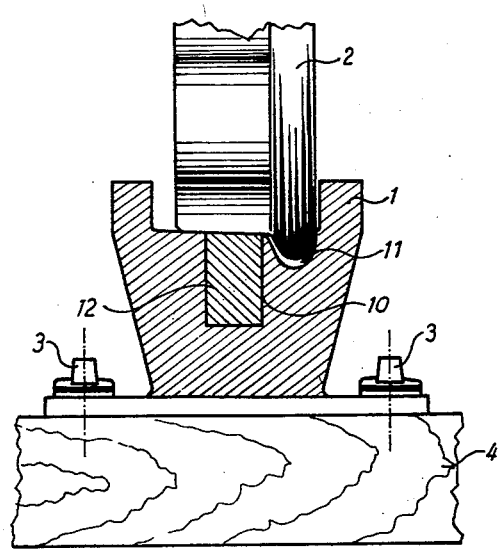
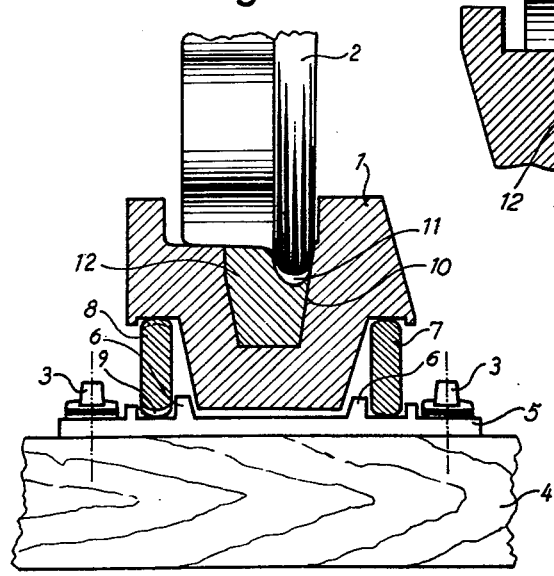
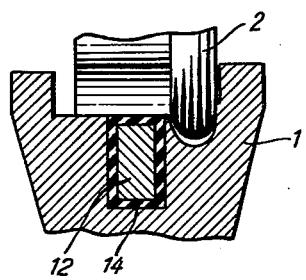

United States Patent Office 3,111,265
Patented Nov. 19, 1963

3,111,265
RAIL FOR RAILWAY VEHICLES
Jakob Huber, Johanniterstrasse 3, Bremgarten, near Bern, Switzerland
Filed May 26, 1961, Ser. No. 112,936
Claims priority, application Switzerland July 7, 1960
5 Claims. (Cl. 238—148)

This invention is concerned with a rail for railway vehicles, made of ferromagnetic material and having means for affecting a vehicle riding thereon by electrodynamic forces.

It is known to equip rails with U-shaped upwardly open magnet yokes which are magnetically energized by current flowing therethrough, for the purpose of affecting railway vehicles by electromagnetic forces. The operative effect of such structures is based upon producing a magnetic flux extending transversely through the rim of a wheel riding between the legs of the magnet yokes, such flux generating, jointly with an electric current fed to the wheel rim or induced thereinto, an electrodynamic force. A drawback of an arrangement of this kind resides, in the case of rails made of ferromagnetic material, in the fact that the rail crown, which extends between the two legs of the magnet yokes, carries considerable magnetic scattering flux which branches off from the operatively effective flux, thus being lost for the purpose of the arrangement.

The present invention proposes to provide a railway rail made of ferromagnetic material and constructed so as to produce electrodynamic forces for affecting vehicles riding thereon, such rail being provided with a longitudinal groove formed therein for receiving at least one electrical conductor and being of a configuration so as to form about the conductor an open magnetic circuit which is closed over the rim of a vehicle wheel riding thereon. Such a rail, while serving the same purpose as the above noted known arrangement which comprises a rail of customary structure and auxiliary magnet yokes, is of simple unitary construction and largely avoids the described drawbacks thereof.

The various objects and features of the invention will appear from the description which is rendered below with reference to the accompanying drawing showing two embodiments thereof.

FIG. 1 shows a part sectional view an example of a rail according to the invention which is firmly anchored upon a support;

FIG. 2 is a sectional view of another embodiment of a rail according to the invention, which is disposed upon a support so as to allow limited motion thereof in a direction transverse to the direction of motion of a vehicle riding thereon; and FIG. 3 is a fragmentary showing based upon FIG. 1 depicting insulation between the conductor and the ferromagnetic portions of the rail.

Referring now to the drawing, the rail 1 is a prismatic body of ferromagnetic material, preferably steel. The rail is provided with a longitudinal groove 10 formed therein, for receiving one or more electrical conductors 12 which are to be supplied with energizing current for the magnetization of a wheel riding thereon. The rail is also provided with a groove 11 formed therein for the flange of the wheel, and with extensions projecting upwardly from the operatively effective rail crown on both sides thereof, so as to form an open magnetic circuit extending about the electrical conductor means, such circuit being closed over the rim of a wheel 2 riding thereon. In the embodiment according to FIG. 1, the rail is by means of screws 3 mounted on a wooden tie 4. Other suitable fastening means may be provided in connection with rail supports such as ties made of steel or concrete.

The wooden tie has been shown because it meets the requirement going to the insulation of two rails of track for purposes of magnetic excitation or energization by current supplied to the non-insulated conductor means 12. When using steel or concrete ties, it will be necessary to either insulate the rails with respect to such ties, by means of suitable base members, or to use insulated electrical conductors such as indicated by numeral 12, the latter in such case having an insulating outer covering of suitable material. Such a conductor has been illustrated in FIG. 3 where the conductor 12 is covered with insulation 14.

In the embodiment according to FIG. 2, there is provided a base plate 5 which is fastened to the tie 4 by means of screws 3. If it is desired to provide exclusively for a horizontal motion of the rail 1, the left and the right side thereof can be supported on the base plate 5 by means of supports shown at the right hand side of FIG. 2. These supports 7 are at the top and the bottom, that is, at the supporting ends thereof, terminated by cylindrical surfaces which extend axially in parallel and preferably concentrically. The motion is limited by the ribs 6 extending from the base plate 5.

In case it is desired that the rail should also be yieldable or displaceable vertically, it may be supported at the left and at the right side thereof by means of resilient supports as shown at the left in FIG. 2. The respective supports are in the form of rods of spring steel of the cross-sectional configuration shown, which exhibit slight vertical undulations so as to provide, as seen in the direction of travel of a vehicle, alternately engagement on top with the rail and at the bottom with the base plate. The limitation of the yielding is determined by the amount 9 of the undulation as shown at the left of FIG. 2.

The groove 10 for the conductor means may be arranged as shown in FIG. 1 regardless of whether the rail is arranged fixedly or for limited relative motion. The groove 11 for the wheel flange is in this case formed outside of the conductor groove 10, the cross-sectional area of which is wholly occupied by one or more electrical conductors 12 which are to carry the current for the energization of the wheel magnetization.

However it is, in the case of a fixed rail or of a rail disposed for limited motion, possible to arrange the conductor groove 10 as shown in FIG. 2. The groove 11 for the wheel flange is in this case formed as a part of the conductor groove, and the conductor means 12 accordingly occupies only part of the conductor groove 10. This arrangement provides in view of the geometric conditions somewhat more space for the electrical conductor means without impairing the magnetic features of the structure.

Both rails of a track can be mounted fixedly upon a support, as in the case of grooved rail tracks, if the wheel flange groove is made sufficiently large in a manner similar as in the case of so-called grooved rails serving other purposes. However, if it is desired to make the wheel flange groove narrower and of lesser depth, for improving the magnetic properties with avoidance of air gaps in a track with two rails made according to the invention, one rail should be mounted on its support so as to provide for limited motion (displacement) transverse to the direction of travel of vehicles riding thereon.

Rail tracks provided with rails according to the present invention are, for example, used as locally fixed brake means or as deceleration means for cars in switch yards. Another possibility of using the invention resides in rail controlled conveyor systems since it permits remote control of rail vehicles which are as such lacking control by motors.

Changes may be made within the scope and spirit of the appended claims which define what is believed to be new and desired to have protected by Letters Patent.

I claim:

1. A railway rail for exerting electrodynamic forces on a vehicle wheel having a rim and a flange, said rail comprising a ferromagnetic body with an upper surface containing a longitudinal groove having side walls, electrical conductor means supported in said groove and extending longitudinally thereof, said upper surface including a wheel-rim supporting surface adjacent said groove, said rail containing a second longitudinal groove in its upper surface remote from said supporting surface and adjacent a side wall of the first said groove for reception of a wheel flange, said second groove having inner and outer side walls, and a ferromagnetic portion of said rail constituting a portion of the outer side wall of said second groove for establishing a low reluctance magnetic path with a wheel.

2. A rail according to claim 1, wherein said first-mentioned groove is wholly filled by said conductor means.

3. A rail according to claim 1, wherein said first groove extends to a level lying below the range encompassed by the wheel flanges, and wherein said second groove is at least in part delimited by said conductor means.

4. A rail according to claim 1, comprising a support, and means for mounting said rail on said support for limited motion thereon normal to the direction of motion of the vehicle riding thereon.

5. A rail according to claim 4, wherein said first groove contains at least one electrical conductor which is insulated from the rail.

References Cited in the file of this patent

UNITED STATES PATENTS

| | | |
|---|---|---|
| 2,540,433 | Evans | Feb. 6, 1951 |

FOREIGN PATENTS

| | | |
|---|---|---|
| 550,506 | Germany | May 18, 1932 |
| 609,249 | Germany | Feb. 11, 1935 |
| 1,051,895 | Germany | Mar. 5, 1959 |
| 671,480 | France | Sept. 2, 1929 |
| 914 of 1877 | Great Britain | Mar. 7, 1877 |

OTHER REFERENCES

Railway Signaling for November 1939, page 616.